(12) United States Patent
Clarke et al.

(10) Patent No.: US 12,259,298 B2
(45) Date of Patent: Mar. 25, 2025

(54) PRESSURE TESTING APPARATUS AND METHOD

(71) Applicant: Integrated Pressure Solutions Inc., Toronto (CA)

(72) Inventors: Robert Turner Clarke, Cambridge (CA); Robert Cassin McFadden, Ottawa (CA); Valen Varangu-Booth, Branchton (CA)

(73) Assignee: Robert Turner Clarke, Ontario (CA)

( * ) Notice: Subject to any disclaimer, the term of this patent is extended or adjusted under 35 U.S.C. 154(b) by 0 days.

(21) Appl. No.: 17/398,488

(22) Filed: Aug. 10, 2021

(65) Prior Publication Data

US 2022/0050005 A1 Feb. 17, 2022

Related U.S. Application Data

(60) Provisional application No. 63/064,178, filed on Aug. 11, 2020.

(51) Int. Cl.
*G01M 3/26* (2006.01)

(52) U.S. Cl.
CPC .................................. *G01M 3/26* (2013.01)

(58) Field of Classification Search
CPC .... G01M 3/26; G01M 3/2846; G01M 3/2853; G01M 3/226; G01M 3/02; G01M 3/3263; G01M 3/2815; G01N 3/12; E03B 7/003
USPC .................................................... 73/40–49.8
See application file for complete search history.

(56) References Cited

U.S. PATENT DOCUMENTS

| | | | | |
|---|---|---|---|---|
| 374,008 A * | 11/1887 | Schuyler | ................. | F17C 13/04 137/15.04 |
| 2,873,764 A | 2/1959 | Lombard et al. | | |
| 2,959,955 A | 11/1960 | Pasquale | | |
| 3,460,376 A | 8/1969 | Kemp | | |
| 3,577,768 A * | 5/1971 | Aprill, Jr. | ................. | G01N 3/12 73/40.5 R |
| 3,584,500 A * | 6/1971 | Diehl | ..................... | B60T 17/222 73/39 |
| 3,756,072 A * | 9/1973 | MacMurray | ......... | G01M 3/3209 73/40.5 R |
| 3,827,282 A * | 8/1974 | Brister | ....................... | 73/40.5 R |
| 4,497,290 A * | 2/1985 | Harris | ...................... | F02M 1/16 123/179.11 |

(Continued)

FOREIGN PATENT DOCUMENTS

| | | | | |
|---|---|---|---|---|
| EP | 2177889 A1 * | 4/2010 | .......... | G01M 3/3263 |
| GB | 2553833 A * | 3/2018 | ............. | E03B 7/003 |

OTHER PUBLICATIONS

2015 Uniform Plumbing Code, International Association of Plumbing and Mechanical Officials, 2015. (Year: 2015).*

(Continued)

*Primary Examiner* — Marrit Eyassu
(74) *Attorney, Agent, or Firm* — Smart & Biggar LP (57) ABSTRACT

An apparatus for pressure testing a plumbing system, including a fluid pump; a conduit assembly coupled to the fluid pump, a control system communicatively coupled to the conduit assembly to operate the conduit assembly according to a preset operating schedule to acquire a set of pressure data; and an input-output communications device communicatively coupled to the control system to receive a set of pressure data and provide the set of pressure data to a user.

8 Claims, 6 Drawing Sheets

(56) References Cited

U.S. PATENT DOCUMENTS

| | | | | |
|---|---|---|---|---|
| 4,542,642 A * | 9/1985 | Tagliarino | G01M 3/022 | |
| | | | 138/90 | |
| 4,580,442 A * | 4/1986 | Jones | G01M 3/20 | |
| | | | 73/40 | |
| 4,599,890 A | 7/1986 | Girone et al. | | |
| 4,608,857 A * | 9/1986 | Mertens | G01M 3/2815 | |
| | | | 73/49.1 | |
| 4,998,434 A * | 3/1991 | Asbra | G01M 3/02 | |
| | | | 73/40.5 R | |
| 4,998,435 A | 3/1991 | Miller et al. | | |
| 5,201,213 A * | 4/1993 | Henning | G01M 3/3236 | |
| | | | 73/40 | |
| 5,323,640 A * | 6/1994 | Porcaro | G01M 3/3236 | |
| | | | 73/40 | |
| 5,499,529 A * | 3/1996 | Kronberg | G01M 3/227 | |
| | | | 73/40.7 | |
| 5,548,993 A * | 8/1996 | Alexander | G01M 3/2815 | |
| | | | 73/40.5 R | |
| 5,705,737 A * | 1/1998 | Liao | G01M 3/025 | |
| | | | 73/40 | |
| 5,850,037 A * | 12/1998 | Mullins | G01M 3/2815 | |
| | | | 73/40.5 R | |
| 5,866,802 A | 2/1999 | Kimata et al. | | |
| 6,116,082 A | 9/2000 | Pride | | |
| 6,279,383 B1 * | 8/2001 | Balke | G01M 3/2876 | |
| | | | 73/40 | |
| 6,311,548 B1 * | 11/2001 | Breidenbach | F02M 25/0809 | |
| | | | 73/114.39 | |
| 6,651,486 B1 * | 11/2003 | Johnson | G01M 3/2815 | |
| | | | 73/40 | |
| 6,758,975 B2 * | 7/2004 | Peabody | A61L 2/022 | |
| | | | 210/257.2 | |
| 6,826,957 B2 * | 12/2004 | Martone | G01M 3/3236 | |
| | | | 73/40.5 R | |
| 6,862,918 B2 | 3/2005 | Saxton | | |
| 6,955,170 B1 * | 10/2005 | Mullins | A62B 27/00 | |
| | | | 128/200.14 | |
| 7,013,711 B1 * | 3/2006 | Herbers | G01M 3/2815 | |
| | | | 73/49.1 | |
| 7,086,272 B2 * | 8/2006 | Wu | G01L 17/00 | |
| | | | 73/1.59 | |
| 7,185,529 B2 * | 3/2007 | Ball | G01M 3/02 | |
| | | | 4/255.08 | |
| 7,210,336 B1 * | 5/2007 | Chapman | G01M 3/2807 | |
| | | | 73/40 | |
| 7,263,873 B2 * | 9/2007 | Richey | G01M 3/2815 | |
| | | | 73/49.1 | |
| 7,409,852 B2 * | 8/2008 | Herzog | G01M 3/3236 | |
| | | | 73/49.2 | |
| 7,788,967 B2 * | 9/2010 | Golding | G01M 3/226 | |
| | | | 73/40.5 A | |
| 7,841,229 B2 * | 11/2010 | Ridgway | G01M 3/28 | |
| | | | 73/49.7 | |
| 7,971,472 B2 * | 7/2011 | Sleijpen | G01M 3/26 | |
| | | | 73/46 | |
| 8,074,627 B2 * | 12/2011 | Siddiqui | F02M 25/0818 | |
| | | | 123/520 | |
| 8,554,497 B2 * | 10/2013 | Hamilton | G01M 3/2846 | |
| | | | 702/50 | |
| 8,771,085 B1 * | 7/2014 | Clyde | G06F 1/1698 | |
| | | | 463/47.4 | |
| 8,798,913 B2 * | 8/2014 | Humphrey | G01F 23/0061 | |
| | | | 701/408 | |
| 8,862,055 B2 * | 10/2014 | Mirbaha | H04W 4/029 | |
| | | | 455/518 | |
| 9,086,187 B2 * | 7/2015 | Gibb | F17C 1/00 | |
| 9,239,008 B2 * | 1/2016 | Ekanayake | G01M 3/025 | |
| 9,261,426 B2 * | 2/2016 | Penza | G01M 3/2815 | |
| 9,429,493 B2 * | 8/2016 | Halliwill | G01M 3/16 | |
| 9,541,467 B2 * | 1/2017 | McCollom | G01M 3/04 | |
| 9,855,395 B2 * | 1/2018 | Jaffe | G01L 13/00 | |
| 9,910,054 B2 * | 3/2018 | Johns | G01N 35/0099 | |
| 9,967,022 B2 * | 5/2018 | Jurkowitz, Jr. | G01M 3/2876 | |
| 10,067,973 B2 * | 9/2018 | Moore | G01V 11/00 | |
| 10,082,249 B2 | 9/2018 | Albertao et al. | | |
| 10,190,298 B2 * | 1/2019 | Slate | G01M 3/2815 | |
| 10,288,519 B2 * | 5/2019 | De La Cruz | G01M 3/2815 | |
| 10,295,430 B2 * | 5/2019 | Qiu | G01M 3/086 | |
| 10,458,880 B2 * | 10/2019 | Levine | G01M 3/2815 | |
| 10,605,692 B2 * | 3/2020 | Hilpert | E21B 33/061 | |
| 10,755,545 B2 * | 8/2020 | Sudo | G02B 27/017 | |
| 10,851,728 B2 * | 12/2020 | Bryan | F02D 41/144 | |
| 10,898,329 B2 * | 1/2021 | Marquez | A61F 2/76 | |
| 11,035,749 B2 * | 6/2021 | Sixsmith | G01M 3/2815 | |
| 11,121,887 B2 * | 9/2021 | Khalid | H04W 4/80 | |
| 11,300,472 B2 * | 4/2022 | Platel | B64D 45/00 | |
| 11,549,837 B2 * | 1/2023 | Klicpera | G06Q 50/06 | |
| 2004/0118186 A1 * | 6/2004 | Shultis | F17D 5/02 | |
| | | | 73/49.2 | |
| 2006/0033075 A1 * | 2/2006 | Harris | C09K 3/12 | |
| | | | 252/72 | |
| 2012/0102323 A1 * | 4/2012 | Lin | H04L 9/0844 | |
| | | | 713/168 | |
| 2017/0044744 A1 * | 2/2017 | Everhart | E03B 7/003 | |
| 2018/0094415 A1 * | 4/2018 | Slate | G01M 3/2815 | |
| 2019/0234786 A1 | 8/2019 | Klicpera | | |
| 2019/0360888 A1 * | 11/2019 | Carey | G01M 3/26 | |
| 2020/0080878 A1 * | 3/2020 | Banerjee | G01M 3/002 | |
| 2020/0088618 A1 * | 3/2020 | Voight | G01N 35/00871 | |
| 2020/0096413 A1 * | 3/2020 | Banerjee | G01M 3/2815 | |
| 2021/0199214 A1 * | 7/2021 | Sorlie | F16K 37/0091 | |
| 2021/0310428 A1 * | 10/2021 | Bryan | F02D 41/042 | |

OTHER PUBLICATIONS

Building Certificate Of Plumbing Compliance, Government of Tasmania, 24ay 2013 (Year: 2013).*

Tasmania Building Act 2000, Government of Tasmania, 2000. (Year: 2000).*

"Plumbing Rough-In Pressure Test PSI", Home Improvement Forums, available on the internet at <https://diy.stackexchange.com/questions/86177/plumbing-rough-in-pressure-test-psi>, Mar. 2016. (Year: 2016).*

Karen Kent et al., "Guide to Integrating Forensic Techniques into Incident Response", National Institute of Standards and Technology Special Publication 800-86, U.S. Department of Commerce, Aug. 2006. (Year: 2006).*

* cited by examiner

PRESSURE TESTING APPARATUS AND METHOD

CROSS-REFERENCE

The present application claims benefit of U.S. Provisional Patent Application No. 63/064,178 entitled PRESSURE TESTING APPARATUS AND METHOD, filed Aug. 11, 2020, the entirety of which is incorporated herein by reference.

TECHNICAL FIELD

The disclosure relates to pressure testing, and in particular, to a method and apparatus for pressure testing a plumbing system.

BACKGROUND

Plumbing systems are typically expected to be capable of holding pressurized fluid. For example, the hot and cold water lines of a residential plumbing system are generally expected to be capable of holding fluid (i.e. water) pressurized to at least the same pressure as a residential water main. In many cases, hot and cold water lines of a residential plumbing system are expected to be capable of holding fluid pressured to at least 40 pounds per square inch (psi).

Many authorities (e.g. governmental authorities or plumbing component manufacturers) suggest or require that a pressure test be conducted on a plumbing system, and may require that the plumbing system be capable of holding a pressure that is well above the pressure of a residential water main. For example, some manufacturers of plumbing components (e.g. piping or fixtures) require that a pressure test be conducted on a plumbing system after their plumbing components are installed to verify that the plumbing system is capable of holding an expected level of fluid pressure. In some cases, passing a pressure test is required for a warranty to be valid. Many municipalities or water supply authorities also require that a pressure test be conducted after a plumbing system is installed and/or repaired, and may require periodic pressure tests.

Often, pressure tests are skipped or carried out in a non-standardized, non-documented, subjective, and/or labour-intensive way. For example, after installing or repairing a plumbing system, a plumber may isolate a line of the plumbing system, couple a pump to the line, turn on the pump to pressurize the line, turn off the pump, and then monitor a pressure gauge that is operable to measure the pressure of the line. A pressure test may take several hours or even days, and a plumber may need to monitor the pressure gauge over this time.

There is accordingly a need for improved methods and systems for pressure testing a plumbing system.

SUMMARY

According to a first aspect, there is provided an apparatus for pressure testing a plumbing system, comprising a fluid pump; a conduit assembly coupled to the fluid pump, the conduit assembly having at least one testing branch, each testing branch including a testing conduit having a plumbing outlet to be coupled to a line of the plumbing system to fluidly couple the plumbing system to the fluid pump, and a pressure sensor coupled to the testing conduit to sense a fluid pressure within the testing conduit; a control system communicatively coupled to the fluid pump and the conduit assembly to operate the fluid pump and the at least one pressure sensor and operable to selectively close one or more testing branch of the conduit assembly to prevent fluid flow therethrough, the control system including a processor for operating the fluid pump and the at least one pressure sensor and for selectively closing the one or more testing branch according to a preset operating schedule and acquiring a set of pressure data; and an input-output communications device communicatively coupled to the control system to receive the set of pressure data and provide the set of pressure data to a user.

In some examples, each testing branch of the conduit assembly further comprises a valve system including a testing valve between the fluid pump and the pressure sensor governing fluid flow through the testing conduit between the fluid pump and the plumbing outlet, and wherein the control system is operable to selectively close the testing valve to close the testing branch to prevent fluid flow through therethrough.

The input-output communications device may be a network device, and the control system may be configured to detect an equipment setup fault in the set of pressure data and send a fault alert notification to a user device via the network device.

The input-output communications device may be a network device, and the control system may be configured to transmit the set of pressure data to at least one external data storage device via the network device.

The control system may be configured to compare the set of pressure data to a set of pressure loss profiles to determine a suggested pressure loss cause, and associate the suggested pressure loss cause with the set of pressure data.

The set of pressure loss profiles may be provided to an artificial intelligence, and the artificial intelligence may be operable to recognize the existence of an issue and provide a notification alert to a user device via the input-output communications device.

The at least one testing branch may include a hot water line testing branch to be coupled to a hot water line of the plumbing system and a cold water line testing branch to be coupled to a cold water line of the plumbing system, wherein each of the hot water line testing branch and the cold water line testing branch may be selectively closed independent of the other.

The at least one testing branch may include a drain line testing branch to be coupled to a drain line of the plumbing system, and the drain line testing branch may be selectively closed independently of any other testing branch.

The control system may be communicatively coupled to a user device via the input-output communications device to receive an instruction from the user device to operate the fluid pump and the at least one pressure sensor according to the preset operating schedule.

The user device may be operable to scan a code on a component of the plumbing system and retrieve an identifier, and the user device may be operable to provide the identifier to the control system via the input-output communications device, and the control system may be operable to associate the identifier with the set of pressure data.

The pressure testing apparatus may be a portable apparatus and may further comprise at least one of a location system to provide a set of location information to be associated with the set of pressure data or a clock to provide a set of clock information to be associated with the set of pressure data.

The fluid pump may be an air compressor.

The control system may include a processor and a computer readable memory having recorded thereon statements and instructions for execution by the processor, said statements and instructions including instructions to run the preset operating schedule.

The preset operating schedule may include opening the at least one testing branch and then operating the fluid pump to pressurize the plumbing system and then closing the at least one testing branch for a testing time period to prevent fluid leakage out of the plumbing system through the conduit assembly during the testing time period.

The apparatus may further comprise a location system to provide a set of location information, and the control system may be operable to receive the set of location information from the location system; receive an operator identifier and an installer company identifier from the user; and associate the set of location information, the operator identifier, and the installer company identifier with the set of pressure data.

According to a second aspect, there is provided a method of testing the pressure of a plumbing system, comprising joining a fluid pump to the plumbing system via a conduit assembly of a pressure testing apparatus to form a joined system; running a pressure testing cycle of the pressure testing apparatus, the pressure testing cycle including pressuring the joined system to a first prescribed pressure of a plurality of prescribed pressures according to a preset operating schedule using a fluid pump of the pressure testing apparatus; after the joined system is at the first prescribed pressure, closing at least one testing branch of the conduit assembly to prevent fluid leakage from the joined system through the at least one testing branch and keeping the at least one testing branch closed for a first testing time of a plurality of testing times according to the preset operating schedule; after the first testing time, opening the at least one testing branch and pressurizing the joined system to a second prescribed pressure of the plurality of prescribed pressures; after the joined system is at the testing pressure, closing the at least one testing branch to prevent fluid leakage from the joined system through the at least one testing branch and keeping the at least one testing branch closed for a second testing time of the plurality of testing times; monitoring the pressure of the joined system during the plurality of testing times using a pressure sensor of the pressure testing apparatus to compile a set of pressure data, the set of pressure data being time-stamped to show when the set of pressure data was obtained; and storing the set of pressure data on a data storage device to form a forensic record.

In some examples, the second prescribed pressure is lower than the first prescribed pressure.

The pressure testing cycle may further include determining a location of the pressure testing apparatus during the testing time using a location sensor of the pressure testing apparatus, including the location in the forensic record, and including clock time information in the forensic record.

The conduit assembly may include a hot water line branch to be joined to a hot water line of the plumbing system and a cold water line branch to be joined to a cold water line of the plumbing system, and the hot water line branch and the cold water line branch may be independently closed.

The pressure testing cycle may further include, prior to pressurizing the joined system to the first prescribed pressure fluidly separating the fluid pump from the plumbing system; operating the fluid pump to pre-pressurize the conduit assembly; and fluidly joining the fluid pump and the plumbing system.

BRIEF DESCRIPTION OF THE DRAWINGS

The drawings included herewith are for illustrating various examples of systems, methods, and apparatus of the present specification. In the drawings.

DETAILED DESCRIPTION

Various apparatus or processes will be described below to provide an example of each claimed embodiment. No example described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatus or processes described below.

Figure 1:
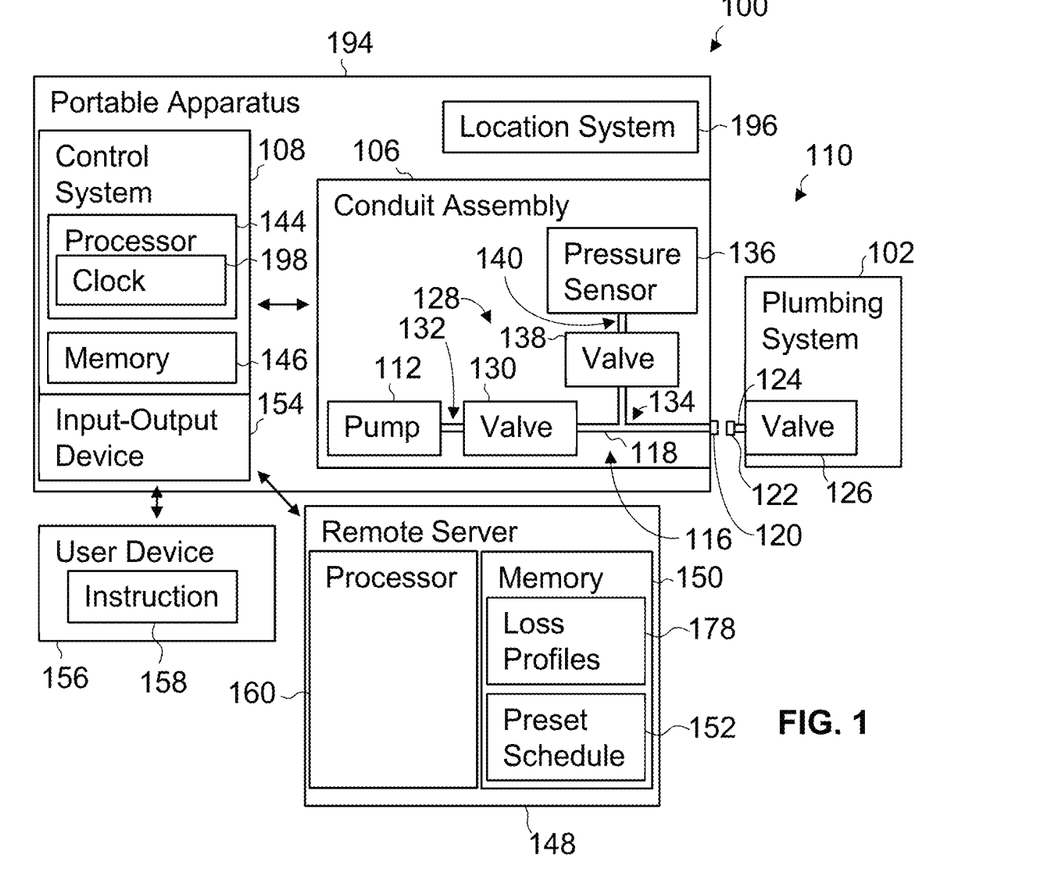
FIG. 1 is a schematic diagram of a first pressure testing apparatus.

Referring now to FIG. 1, a pressure testing apparatus 100 may be provided for pressure testing a plumbing system 102. In some examples, the pressure testing apparatus 100 is operable to test the pressure-holding capability of a plumbing system 102 or a portion thereof. For example, a user (i.e. a plumber) may test a plumbing system 102 after installing the plumbing system or replacing a component of the plumbing system (e.g. replacing a section of piping in a residential hot water line) to verify that the plumbing system meets requirements. The pressure testing apparatus 100 may be operable to pressurize the plumbing system 102 or the portion thereof, close off the plumbing system 102 or the portion thereof, and detect pressure changes over time, such as pressure losses or pressure gains, to check the pressure-holding capabilities of the plumbing system 102.

A pressure test conducted by or using the pressure testing apparatus 100 may be carried out according to a predetermined operating schedule setting out the operation of components (e.g. pumps, valves, and sensors) of the pressure testing apparatus 100, as described further below. In many examples, a predetermined operating schedule is designed to apply a pressure test as defined by one or more authority, such as a manufacturer of a component of the plumbing system (i.e. to verify that manufacturer-mandated testing is conducted, which may optionally be required for warranty validation), a water supply authority (i.e. to verify that local jurisdiction building code requirements are met), and/or a drainage system authority (i.e. again, to verify that local jurisdiction building code requirements are met).

The pressure testing apparatus 100 may be automated or partially automated. For example, the pressure testing apparatus may be able to automatically run a predetermined operating schedule of pressurization and/or monitoring steps, and may be operable to automatically collect a set of pressure data from one or more pressure sensors and store and/or send the set of pressure data (e.g. send to a mobile device and/or a remote server). The set of pressure data may be stored and/or sent in an untampered form as a forensic record, optionally along with further information such as calibration information or supporting information (e.g. location information or clock information) provided by the pressure testing apparatus 100, as described further below.

The pressure testing apparatus 100 includes a conduit assembly 106 to be joined with a plumbing system 102. The conduit assembly 106 is provided to pressurize the plumbing system 102 and to acquire a set of pressure data. The pressure testing apparatus 100 also includes a control system 108 to operate the conduit assembly 106, and may include a power supply (e.g. a power cord to be plugged into a residential power system and/or an onboard power supply such as a battery) to power the pressure testing apparatus 100 (e.g. the control system 108 and/or components of the conduit assembly 106). The conduit assembly 106 may be joinable to the plumbing system 102 to form a joined system 110, such as a joined system of piping and other plumbing system components adapted hold a pressurized fluid.

As discussed, the joined system 110 may be pressurized and monitored according to a testing procedure, protocol, or operating schedule. A testing procedure, protocol, or operating schedule may be a programmed series or sequence of (applied) increased pressures, pressure and time measurements, and decreased (vented) pressures, with a defined time dependency. For example, the joined system 110 may be isolated, pressurized, closed off from a pump 112, and monitored to check if there are any leaks in the joined system. Recorded pressure data may be used, such as stored to form a forensic record, provided to a stakeholder such as a warranty provider, provided to an operator of the pressure testing apparatus 100, analyzed (e.g. analytically or via an artificial intelligence to determine whether the plumbing system passed or failed the test and/or to detect or identify pressure issues) to provide suggestions to the operator in real time, or analyzed and stored as a forensic record, as described further below. The recorded pressure data may be associated with further information, such as information regarding the test procedure that was carried out, location information, and operator information, as described further below.

The conduit assembly 106 includes the fluid pump 112. The fluid pump 112 may be used to pressurize the conduit assembly 106 and/or the joined system 110. The fluid pump 112 may be used to pump fluid into the conduit assembly 106 and/or the joined system 110 to pressurize. The fluid pump 112 may be a liquid or gas pump, and may be, for example, an air compressor. An air compressor may be easy to use, since ambient air may be readily available for use in pressurizing.

The conduit assembly 106 includes at least one testing branch 116. In the illustrated example, the conduit assembly 106 includes a single testing branch 116. Each testing branch 116 includes a testing conduit 118 having a conduit outlet 120 (e.g. a port) to be coupled to a plumbing system outlet 122 (e.g. a port) of a line 124 of the plumbing system 102 to fluidly couple the plumbing system 102 to the fluid pump 112. Optionally, the line 124 of the plumbing system 102 is governed by a valve 126 of the plumbing system 102.

The pressure testing apparatus 100 is selectively operable to close one or more testing branch of the conduit assembly to prevent fluid flow through the closed testing branch or branches. Each testing branch may be selectively closed independent of each other in some examples. For example, fluid pump 112 may prevent any backflow.

However, as in the illustrated example, each testing branch 116 may include a testing branch valve system 128. Valves of the valve system 128 may be electronically controllable valves, such as solenoid valves. Each testing branch valve system 128 includes at least one testing valve 130 governing fluid flow through the testing conduit 118 between the fluid pump 112 and the conduit outlet 120. The testing valve 130 may be used to fluidly separate the fluid pump 112 and the plumbing system 102. For example, the fluid pump 112 may be used to pre-pressurize an upstream portion 132 of the testing conduit 118 before that upstream portion 132 of the testing conduit 118 is opened to the plumbing system 102, such as to prevent the fluid in the plumbing system 102 from surging against the fluid pump 112. A testing valve 130 may also be used to fluidly separate a downstream portion 134 of the testing conduit 118 from the fluid pump 112, such as to permit the pump to pressurize the joined system 110 and then seal the plumbing system 102 and downstream portion 134 for a period of time to allow the pressure therein to be monitored.

Each testing branch 116 includes at least one pressure sensor 136 coupled to the testing conduit 118 between the testing valve 130 and the conduit outlet 120 to sense a fluid pressure within the testing conduit 118. Output from the at least one pressure sensor 136 may be received by the control system 108, discussed further below. In some examples, sensors (e.g. the pressure sensor 136) of the pressure testing apparatus 100 output digital outputs. In some examples, one or more sensors of the pressure testing apparatus 100 outputs an analog output, and the pressure testing apparatus 100 includes at least one analog to digital converter to convert the analog output to a digital output prior to providing the output to be processed by a processor of the pressure testing apparatus 100.

The illustrated example testing branch valve system 128 includes an optional sensor valve 138 governing fluid flow between the testing conduit 118 and the pressure sensor 136. For example, the sensor valve 138 may be used to protect the pressure sensor 136 from a surge in fluid from the plumbing system 102. When the plumbing system 102 is joined to the conduit assembly 106, the fluid, such as water, in the plumbing system 102 may enter the conduit assembly 106 or a portion thereof. The pressure sensor 136 may be damaged by this fluid, particularly if the pressure sensor is designed for use in sensing the pressure of a gas such as air, and the fluid of the plumbing system 102 is a liquid such as water. The sensor valve 138 may be kept closed until the conduit assembly 106 is pressurized by the fluid pump 112. The sensor valve 138 may be used to preserve a quantity of gas adjacent the pressure sensor 136 in the sensor portion 140 of the conduit assembly 106 to form a bubble or buffer between the pressure sensor 136 and other fluid, such as water, in the conduit assembly 106.

The control system 108 is communicatively coupled to the conduit assembly 106 to selectively close one or more testing branch of the conduit assembly to prevent fluid flow therethrough (e.g. according to a preset operating schedule). As in the illustrated example, the control system 108 may selectively close the one or more testing branch by operating and/or communicating with valves (e.g. each valve system 128), sensors (e.g. each pressure sensor 136), and/or the fluid pump 112 of the pressure testing apparatus 100. For example, the control system 108 may be operable to control the opening and closing of valves of a valve system 128 and operable to monitor and/or record the output of an pressure sensor 136. Optionally, the control system 108 is also operable to control the fluid pump 112.

The control system 108 includes at least one processor 144. The processor 144 may be an on-board processor. For example, the control system 108 may include a micro computer, such as an Internet of Things micro computer (e.g. the Omega2 LTE Global IoT micro computer). The processor 144 may be coupled to the fluid pump 112, the valves (e.g. the valve system 128), and/or the sensors (e.g. the pressure sensor 136) to operate and/or monitor the pump, valves, and/or sensors.

The control system 108 also includes at least one data storage device 146 or computer readable memory communicatively coupled to the processor 144. The data storage device 146 or computer readable memory may have recorded thereon statements and instructions for execution by the processor 144, such as instructions to run a preset operating schedule.

The preset operating schedule may be part of a set of at least one preset operating schedules defining operational states, sequences, and/or durations of components of the pressure testing apparatus 100 (e.g. when to activate the pump 112, open and close valves 128, and gather data from the pressure sensor 136). The set of preset operating schedules may be updatable, to allow for new schedules to be added for new jurisdictions or authorities or to allow for changes in schedules to reflect changing requirements. The set of preset operating schedules may be stored on the data storage device 146 or on an external device such as a mobile device or server (e.g. the statements and instruction on the computer readable memory may include instruction to access a preset operating schedule on an external device).

At least one input-output communications device 154 is communicatively coupled to the control system 108. In some examples, the input-output communications device 154 is a non-network device, such as simply a touchscreen or a set of buttons and lights. However, in some examples, the input-output communications device 154 is a network device.

A network device is a node in a wireless mesh network and can transmit and receive wireless data and perform basic functions necessary to support network formation and maintenance. The input-output communications device 154 may include a plurality of input-output communications devices, such as a wireless local area network communications device (e.g. a Wi-Fi™ communications device) and a wireless wide area network communications device (e.g. a 4G LTE™ communications device).

The control system 108 may be communicatively coupled to external and/or remote devices through the input-output communications device 154. For example, the processor 144 may be communicatively coupled to at least one remote server 148 (i.e. at least one cloud server) and/or at least one remote data storage device 150 through the input-output communications device 154.

The control system 108 may be communicatively coupled to a user device 156 (e.g. a mobile device such as a smartphone or tablet) via the input-output communications device 154. In some examples, the control system 108 is communicatively coupled to the user device 156 to receive an operating instruction 158 from the user device 156. The operating instruction 158 may direct the operation of the control system 108, such as to direct the control system 108 to access a selected operating schedule 152 and operate the fluid pump 112, the valve system 128, and the pressure sensor 136 according to the selected operating schedule 152. In some examples, the operating instruction 158 is selected from a list of predefined options, and the operator is restricted to one of the predefined options. The predefined options may be changed by reprograming or updating.

In some examples, the user device 156 is a mobile device such as a mobile phone. The pressure testing apparatus 100 may require a certified and/or password protected user mobile device application to be installed on the mobile device before the mobile device can be used to direct the pressure testing apparatus 100 (i.e. before the mobile device can be used to send the instruction 158).

The user device 156 may be operable to scan a code on a component of the plumbing system 102. For example, the user device 156 may be operable to scan a bar code or quick response code printed on a fitting such as a pipe. The user device 156 may be operable to retrieve an identifier, such as a serial number of the component of the plumbing system 102, and provide the identifier to the control system 108 via the input-output communications device. The control system 108 may be operable to associate the identifier with the set of pressure data.

The control system 108 may be operable to gather a set of pressure data during a pressure test. For example, the processor 144 may be operable to receive output from the sensors (e.g. the pressure sensor 136) as a set of pressure data. The control system 108 may be operable to send the set of pressure data to the remote server 148 and/or remote data storage device 150 for storage, such as for storage as a forensic record. Storage of the set of pressure data on the remote server 148 may facilitate access to the set of pressure data by parties other than the user of the user device 156.

The set of pressure data may be sent via a secure connection and in untampered form. In some examples, the pressure testing apparatus 100 is operable to send a set of pressure testing data and optional supporting information (e.g. location and clock time information) directly (i.e. without providing access to any party, including the party initiating the pressure test) to the remote server 148 via a secure connection. Directly sending the set of pressure testing data and optional supporting information to the remote server 148 may remove opportunities to tamper with the set of pressure testing data and optional supporting information.

Figure 2:
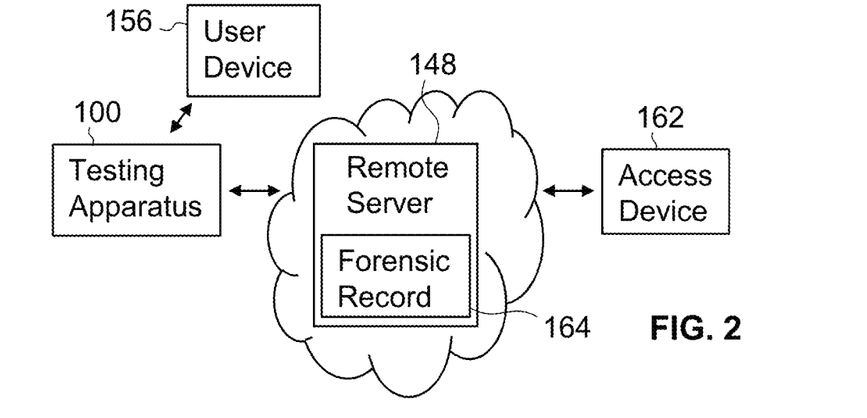
FIG. 2 is a schematic diagram of a forensic records system.

Referring now to FIG. 2, in some examples the remote server 148 is communicatively coupled to an access device 162 such as a desktop computer of a plumber, building owner, equipment manufacturer, or insurance party. Accordingly, the access device 162 may be used to view and/or manipulate the set of pressure data. Final reporting, warranty, and closing documents may be automatically delivered to qualified parties (e.g. homeowners, engineers, local building departments, insurers, etc.) registered against a specific test site by an authorized party such as the installer's home office.

In some examples, the set of pressure data is stored as a forensic record 164. A forensic record 164 may be a secure record containing the set of pressure data in an untampered form to be used to verify the results of a pressure test. In some examples, the forensic record 164 also includes further supporting information, as discussed further below.

Referring again to FIG. 1, in some examples, the remote server 148 includes at least one processor 160 (i.e. a cloud computing processor). The control system 108 may be operable to send the set of pressure data to the processor 160 to be processed, such as to be processed in real time to provide a user (i.e. a plumber) with an alert and/or suggestion if an issue is detected, as discussed further below. The remote processor 160 may have greater processing capabilities than one on-board processor 144 of the control system 108.

In use, the control system 108 may receive an instruction 158 from the user device 156 to implement a preset operating schedule 152. The control system 108 may access the preset operating schedule 152 stored on the remote server 148 and then operate the pressure testing apparatus 100 as directed by the present operating schedule 152. For example, the preset operating schedule 152 may include opening the testing valve 130, then operating the fluid pump 112 to pressurize the plumbing system 102, then closing the testing valve 130 for a testing time period (i.e. to prevent fluid leakage out of the plumbing system 102 through the conduit assembly 106 during the testing time period) while monitoring the output of the pressure sensor 136. The control system 108 may then send the set of monitored pressure data to the remote server 148. If the plumbing system or a line thereof fails to pressurize, such as due to a set up fault or a leak, the pump 112 may be automatically shut off and/or the associated testing branch may be closed to prevent possibly damaging a building due to leaking fluid.

Figure 3:
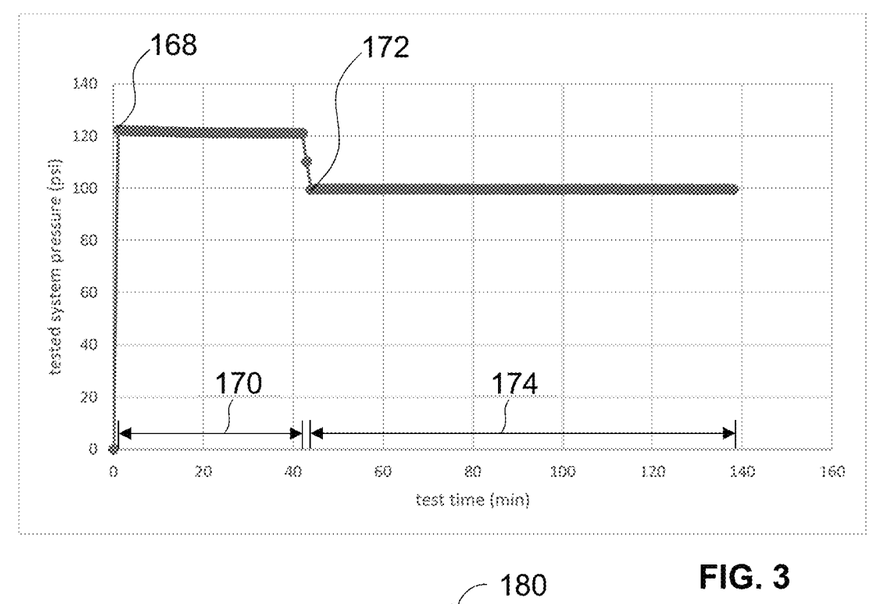
FIG. 3 is an example of a set of pressure data.

Referring now to FIG. 3, illustrated is an example of a set of pressure data obtained from a pressure test. The set of pressure data is presented as a pressure vs. time graph. In some examples, a forensic record includes a set of pressure data presented as a graph, such as a pressure vs. time graph.

In some examples the preset operating schedule 152 (i.e. pressure test) includes pumping the pressure of the joined system 110 to a first prescribed pressure 168 of a plurality of prescribed pressures. The pump and/or testing valve 130 may be turned off or closed when the first prescribed pressure is reached and/or a defined set of measured data indicates a fault condition. Where the defined set of measured data indicates the fault condition the test is optionally aborted with respect to at least one testing branch, though in some examples data will continue to be measured and/or recorded when the test is aborted.

If the first prescribed pressure 168 is reached, the first prescribed pressure 168 may be held for a first length of testing time 170 of a plurality of testing times according to the preset operating schedule. For example, the testing valve 130 may be closed to prevent the joined system 110 from depressurizing through the conduit assembly 106. Then the joined system 110 may be pressurized to a second prescribed pressure 172 of the plurality of prescribed pressures. The second prescribed pressure 172 may be lower than the first prescribed pressure 168 (i.e. pressure may be released). The second prescribed pressure 172 may be held for a second testing time 174 of the plurality of testing times. For example, again, the testing valve 130 may be closed to prevent the joined system 110 from depressurizing through the conduit assembly 106. If the system is able to reach and hold the pressures, the plumbing system may pass the pressure test. An alert may be sent to a user device 156 when the pressure test is complete, and the alert may include an indication of whether the pressure test was passed. The set of monitored pressure data may be sent to the remote server 148.

In some examples, if an issue is encountered during operations of a pressure testing apparatus 100 the set of pressure data may be used to detect the issue and optionally identify a cause of the issue.

The set of pressure data may be analyzed in real time or subsequent to the operations of the pressure testing apparatus 100. Analysis may be manual or automatic. For example, a user may receive the set of pressure data on the user device 148 in real time, and examine the set of pressure data in real time to determine that the pressure in the joined system 110 is not being maintained once the pump 112 is shut off. The user may accordingly check whether all valves closing off the joined system 110 are closed, such as toilet valves or shut off valves governing an opening to a water main. For example, the user may determine that the set of pressure data indicates that a toilet valve of the plumbing system 102 is not closed, and may then close the toilet valve to allow the testing procedure to continue or be restarted.

In some examples, a user may need to be attentive and/or experienced to notice and/or interpret the set of pressure data properly. For example, a busy user may not notice that the set of pressure data indicates that a valve of the pressure testing apparatus 100 failed midway through a test. Failing to notice the issue may result in the test continuing for several additional hours without remedial action being taken, which may result in property damage and/or wasted time. In another example, an inexperienced user may not realize that the inability of the pressure testing apparatus 100 to pressurize the system is a result of one or more known issues, such as failure to close a particular system valve. The user may not recognize characteristics of the set of pressure data that indicate which valve is not working properly.

In some examples, analysis is automatic. For example, the control system 108 may be configured to detect an issue indicated in the set of pressure data (e.g. a failure to reach the first prescribed pressure 168, a significant delay in reaching the first prescribed pressure 168, or a steady or sudden drop in pressure once the pump 112 is shut off) and send a fault alert notification in real time to a user device 148 via the input-output communications device 152.

Optionally, the control system 108 is operable to determine the cause of the leak. In some examples, the control system 108 is configured to compare the set of pressure data to a set of pressure loss profiles 178 to determine a suggested pressure loss cause, and associate the suggested pressure loss cause with the set of pressure data. In the illustrated example, the set of pressure loss profiles 178 are stored on the external data storage device 150, and accessed through the input-output communications device 152. Alternatively, the set of pressure loss profiles 178 may be stored locally or on the user device 148.

The set of pressure loss profiles 178 may be pressure loss profiles for which the cause of the pressure loss event is known. Comparison to the set of pressure loss profiles may facilitate determining the cause of the pressure loss.

Comparing the set of pressure data to a set of pressure loss profiles 178 may be done by matching identifiable characteristics in a set of pressure data to known characteristics. An example of a characteristic is a sudden drop in pressure (i.e. an unintended loss of a predetermined amount of pressure within a predetermined time), indicating a sudden failure of a valve or cartridge. Another example of a characteristic is a steady drop in pressure until the joined system 110 equalizes with the pressure of the water main, indicating that the shut off valve has failed.

Comparing the set of pressure data to a set of pressure loss profiles 178 may include providing the set of pressure data to an artificial intelligence. The artificial intelligence may be operated on the remote server 148. The artificial intelligence may be a neural network that has been trained using the set of pressure loss profiles 178. The artificial intelligence may be trained to recognize the existence of an issue such as a pressure loss event, and may provide a notification alert to the user device 148. The artificial intelligence may also be trained to recognize a cause of an issue, and may suggest a course of action (e.g. suggesting that the plumber check a shower cartridge or a toilet valve or a shut off valve to the water main).

Figure 4:
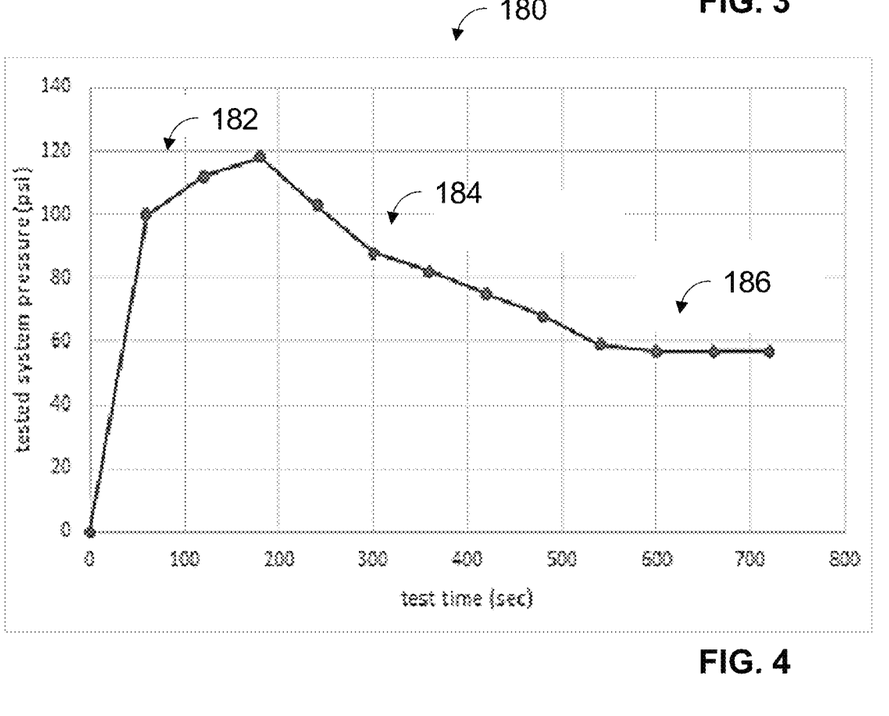
FIG. 4 is a first example pressure loss profile.

Referring now to FIG. 4, illustrated is a first example pressure loss profile 180. The first pressure loss profile 180 displays a deceleration characteristic 182, a slow failure to maintain pressure characteristic 184, and an equilibrium with a water supply pressure characteristic 186. The first pressure loss profile 180 is associated with an issue with the valve between the plumbing system 102 and a main water supply.

The control system 108 may be operable to detect one or more, or two or more, or all three characteristics 182, 184, 186 in a set of pressure data, and alert the user that there is an issue. The control system 108 may be operable to tell the user that the issue is associated with the valve between the plumbing system 102 and the main water supply. The control system 108 may be operable to suggest that the user check that the valve between the plumbing system 102 and the main water supply is fully closed and/or functioning properly.

Figure 5:
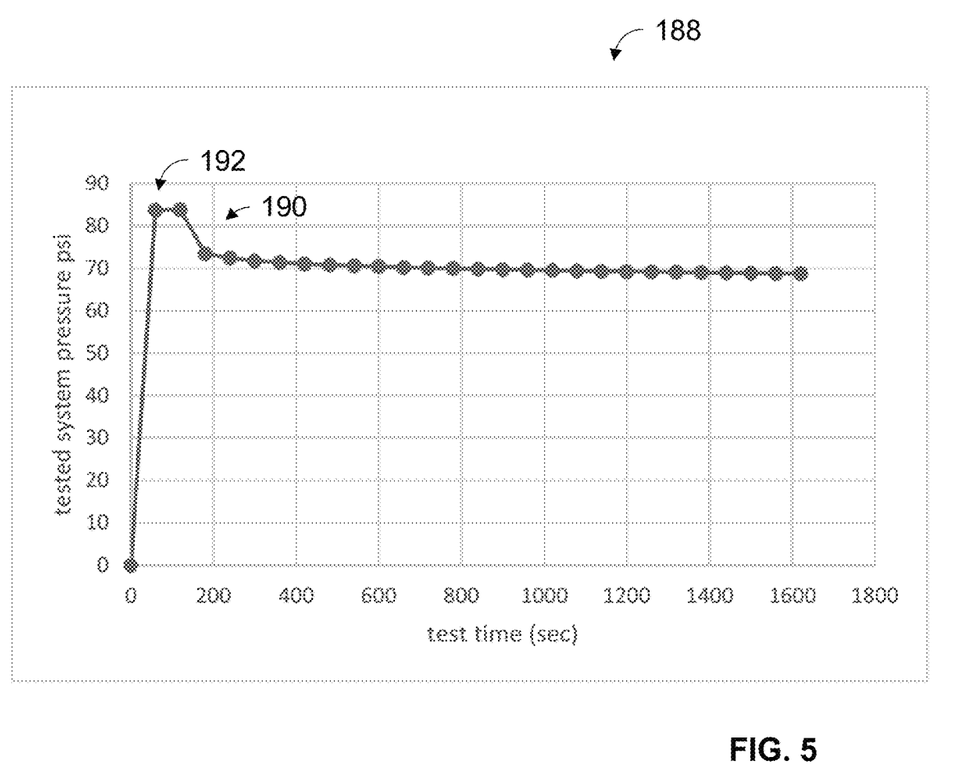
FIG. 5 is a second example pressure loss profile.

Referring now to FIG. 5, illustrated is a second example pressure loss profile 188. The second pressure loss profile 188 displays a sudden loss of pressure characteristic 190 shortly after the pump 112 is turned off at 192. The second pressure loss profile 188 is associated with a failure of a shower cartridge, since the pressure level restabilizes at approximately 70 psi (i.e. the house supply pressure).

The control system 108 may be operable to detect a sudden loss of pressure characteristic 190 and use the restabilization pressure or other subsequent pressure features to determine what the cause of the issue is.

Many pressure loss profiles and/or many pressure loss profile characteristics (e.g. defined as a rate of change of a pressure vs. time curve) may be known and/or applied. For example, many pressure loss profiles, each including one or more characteristics, may be stored to be compared to a set of pressure data to determine the cause of an issue. In another example, many pressure loss profiles and/or pressure loss profile characteristics may be used as input to train an artificial intelligence.

Referring again to FIG. 1, the pressure testing apparatus 100 may be a portable apparatus 194. The portable apparatus 194 is a self-contained unit that can be moved from one job site to another. For example, the portable apparatus 194 may include a housing or frame, and the conduit assembly 106, control system 108, and the input-output communications device 154 may be coupled to the housing or frame. In some examples, the portable apparatus 194 includes a housing or case measuring less than two feet cubed. For example, the portable apparatus 194 may include a housing or case measuring 12 inches by 8 inches by 6 inches.

Information about the location of a pressure test may facilitate using the set of pressure test data in a forensic record, and may be associated with or included in a forensic record. Location information may allow reasonable certainty that the set of pressure test data is from the testing of a particular plumbing system if the location information indicates that the conduit assembly 106 was at the same location as the particular plumbing system when the set of pressure test data was acquired. The location of the pressure test apparatus may be reliably obtained from a location system 196 coupled to the conduit assembly 106.

The illustrated example pressure testing apparatus 100 includes a location system 196 to provide a set of location information to be associated with the set of pressure data. The location system 196 may include a satellite positioning system and/or an altitude sensor. For example, a satellite positioning system (e.g. using global positioning system or other global navigation satellite system technology, or using assisted global positioning system technology incorporating cellphone tower information) may give the map coordinates at which the set of pressure data was acquired. Optionally, altitude may also be provided by the satellite positioning system. Where a separate altitude sensor is included (such as if the altitude information from a satellite positioning system is not accurate enough) the altitude sensor, which may be, for example, a barometer, may give an altitude at which the set of pressure data was acquired. The map coordinates may allow a determination of which building the plumbing system 102 was in, while the altitude information may allow a determination of which floor the plumbing system 102 was on. For example, the location system may facilitate determining which condo unit in a condo tower the plumbing system 102 that was tested was in.

Determining the time at which the set of pressure test data was acquired may also facilitate using the set of pressure test data in a forensic record. The illustrated example pressure conduit assembly 106 includes a clock 198. The clock 198 provides a set of clock information to be associated with the set of pressure data. The clock information may include, for example, a date and time of day. A date and time of day may be added to the set of pressure testing data to allow for verification that the pressure test was performed at the date and time. For example, the date and time of day associated with a set of pressure data may be used to verify that the plumbing system 102 was operating properly at the verified date and time, and any issues must have developed subsequently.

Information about the operator of the apparatus 100 and/or the company the operator works for may also be associated with a set of pressure testing data. For example, the control system 108 may be operable to receive an operator identifier and/or an installer company identifier from the user (e.g. from the user device 156 via the input/output communication device 154). The control system 108 may be operable to associate the operator identifier and the installer company identifier with the set of pressure data. The operator identifier and the installer company identifier may be associated with the set of pressure data prior to the set of pressure data being provided for storage as a forensic record.

An optional calibration step may be performed prior to pressure testing. Calibration information may verified by and/or be traceable to a standards association such as the National Institute of Standards and Technology (NIST).

The pressure testing apparatus 100 may make it possible to compare the performance of a plumbing system with a manufacturer's requirements and/or the requirements set out by a water supply authority or other standards.

Figure 6:
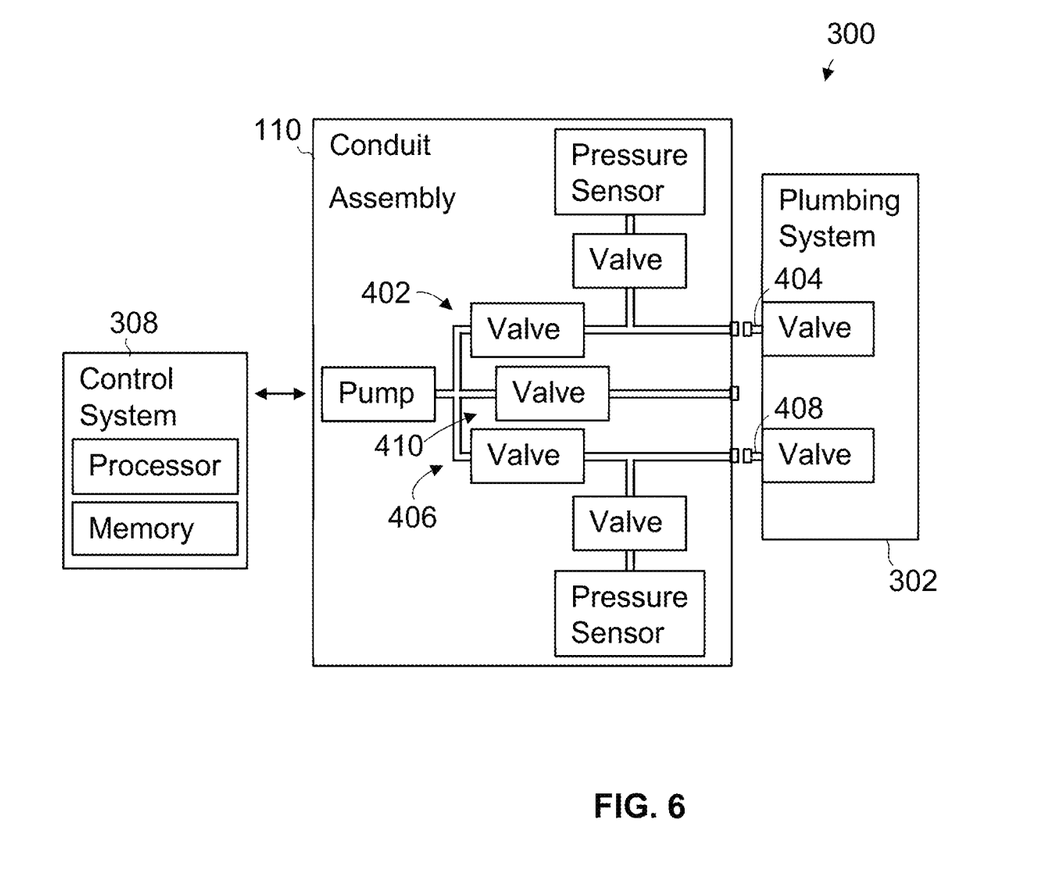
FIG. 6 is a schematic diagram of a second pressure testing apparatus.

Referring now to FIG. 6, a pressure testing system 300 may include a plurality of testing branches. The pressure testing system 300 is similar in many respects to the pressure testing system 100, and like features are indicated with like reference numbers incremented by 200.

A plurality of testing branches may facilitate use with complex plumbing systems, and may allow simultaneous testing of multiple branches of a plumbing system. In the illustrated example, the at least one testing branch includes a hot water line testing branch 402 to be coupled to a hot water line 404 of the plumbing system 302 and a cold water line testing branch 406 to be coupled to a cold water line 408 of the plumbing system 302.

The lines may each be tested independently. Independent testing branches may allow a testing of one line to be unaffected by a testing of another. For example, if the hot water line 404 fails to maintain a testing pressure, the test of the cold water line 408 may be unaffected. If the test of the hot water line 404 is aborted when it becomes apparent that the hot water line 404 is unable to maintain a testing pressure (e.g. if the control system 308 determines that the hot water line 404 has not reached the target pressure within a predetermined duration of time, and accordingly a valve is closed to separate the hot water line 404 from the pump), the test of the cold water line 408 may continue.

Independent testing branches may also allow a testing of one line following a different testing schedule than another. Pressure in one testing branch may be tested more often than pressure in another testing branch. For example, pressure versus time data may be acquired at high, sub-second, sampling rates for higher pressure lines (e.g. hot and cold water lines) and at low, tens of minutes, sampling rates for lower pressure lines (such as drain lines).

The conduit assembly 306 also includes a release line 410 (i.e. a vent line) to release the pressure in the conduit assembly 306. For example, when testing is complete and/or between testing steps when pressure needs to be lowered, the pressure in the conduit assembly 306 may be relieved through the release line 410. For example, the release line 410 may relieve pressure prior to the decoupling of the conduit assembly 306 from the plumbing system 302.

Figure 7:
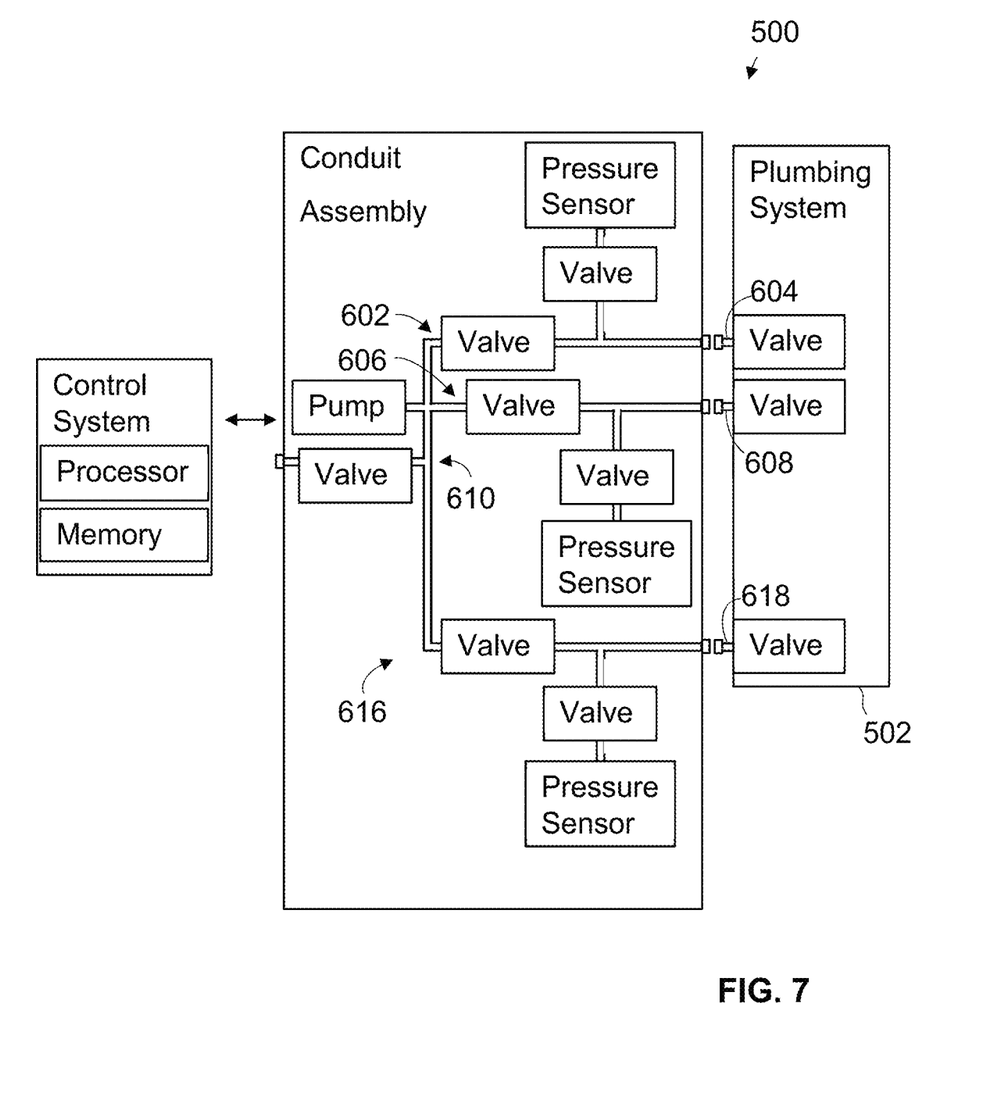
FIG. 7 is a schematic diagram of a third pressure testing apparatus.

Referring now to FIG. 7, a pressure testing system 500 may include independent testing branches that can be pressured to different pressures. The pressure testing system 500 is similar in many respects to the pressure testing system 300, and like features are indicated with like reference numbers incremented by 200.

In the illustrated example, the at least one testing branch includes a drain line testing branch 616 to be coupled to a drain line 618 of the plumbing system 502.

As mentioned above, the lines may each be tested independently. In addition to preventing the pressure in one line from affecting the pressure in another, this may also facilitate running a pressure test on a system that does not require all lines to be capable of handling the same pressure and/or duration. For example, many jurisdictions require that the hot water line 604 and the cold water line 608 are capable of maintaining a high pressure, such as a pressure between 50 and 150 psi. However, a drain line 618 may only need to be capable of maintaining a low pressure, such as a pressure between 2 psi and 10 psi. In another example, the duration of a test of a hot water line or a cold water line may be 2 hours, while the duration of a test of a drain line is 24 hours.

Independent lines may allow the hot water line 604 and the cold water line 608 to be pressurized to a high pressure, such as 120 psi or 80 psi, while the drain line 618 is pressurized to a low pressure, such as 5 psi. For example, the pressure testing apparatus 500 includes a hot water line testing branch 602, a cold water line testing branch 606, and a drain line testing branch 616, in addition to the release line 610.

Figure 8:
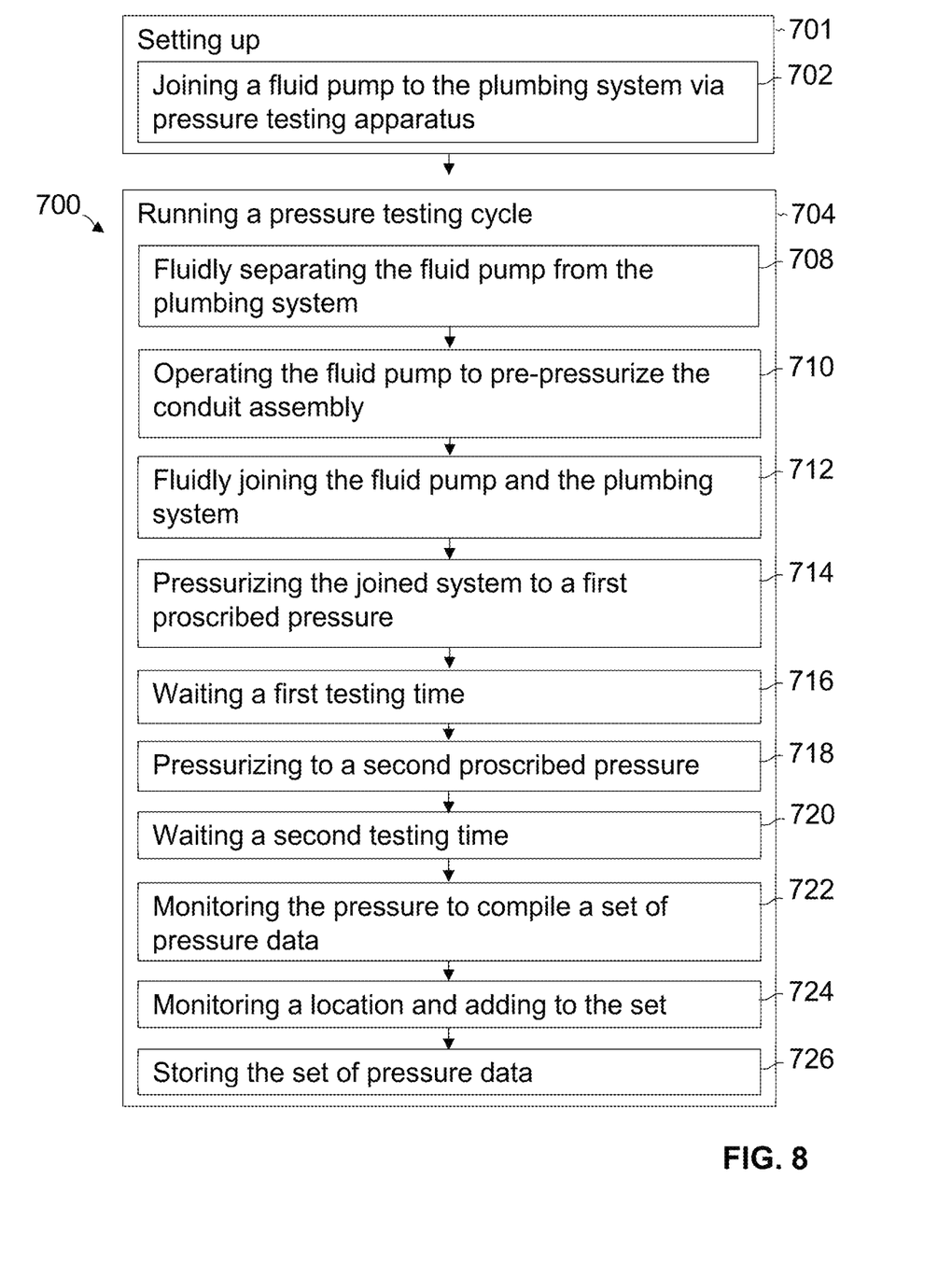
FIG. 8 is a flow chart of a method of testing the pressure of a plumbing system.

Referring now to FIG. 8, a method 700 of testing the pressure of a plumbing system is illustrated. Method 700 includes, at stage 701, setting up for a pressure testing cycle. Stage 701 includes, at step 702, joining a fluid pump to the plumbing system via a conduit assembly of a pressure testing apparatus 100 to form a joined system.

Optionally, the conduit assembly includes a hot water line branch to be joined to a hot water line of the plumbing system and a cold water line branch to be joined to a cold water line of the plumbing system. The at least one valve may include a hot branch valve governing fluid flow through the hot water line branch and a cold branch valve governing fluid flow through the cold water line branch.

Method 700 also includes, at stage 704, running a pressure testing cycle using the pressure testing apparatus 100. The pressure testing cycle may include a plurality of steps, and may be performed according to a preset operating schedule and in accordance with requirements set by an authority, as discussed above.

Stage 704 may include a prepressurization phase. The prepressurization phase includes, at step 708, fluidly separating the fluid pump from the plumbing system (e.g. using the at least one valve), operating, at step 710, a fluid pump of the pressure testing apparatus to pre-pressurize the conduit assembly, and fluidly joining, at step 712, the fluid pump and the plumbing system (e.g. by opening the at least one valve).

Stage 704 includes, at step 714, pressurizing the joined system to a first prescribed pressure of a plurality of prescribed pressures according to a preset operating schedule using the fluid pump. Step 714 may follow the prepressurization phase.

After the joined system is at the first prescribed pressure, at least one testing branch of the conduit assembly is, at step 716, closed to prevent fluid leakage from the joined system through the at least one testing branch (i.e. to isolate the joined system during periods of non-pressurization for purposes of data collection and analysis), and kept closed for a first testing time of a plurality of testing times according to the preset operating schedule.

After the first testing time, the at least one testing branch is, at step 718, opened (e.g. at least one valve is opened) and the joined system is pressurized to a second prescribed pressure of the plurality of prescribed pressures. The second prescribed pressure may be lower than the first prescribed pressure.

After the joined system is at the second prescribed pressure, the at least one testing branch is, at step 720, closed to prevent fluid leakage from the joined system through the at least one testing branch, and kept closed for a second testing time of the plurality of testing times.

Running a pressure testing cycle also includes, at step 722, monitoring the pressure of the joined system during the plurality of testing times using a pressure sensor of the pressure testing apparatus to compile a set of pressure data. The set of pressure data may be time-stamped to show when the set of pressure data was obtained.

At step 724, a location of the pressure testing apparatus during the testing time is determined using a location sensor of the pressure testing apparatus, and the location is included in the forensic record. A clock time of day and date information may also be included in the forensic record.

At step 726, the set of pressure data is stored on a data storage device (e.g. pressure data, clock information, and location information) to form a forensic record.

It is to be understood that while method 700 is described above as applying one test protocol to a single testing branch, a testing apparatus may include more than one testing branch (e.g. 2, 3, 5, 10 or more testing branches). Further, a testing apparatus or system may be programmable such that any custom or predefined testing protocol or operating schedule can be used. For example, a user could apply a testing protocol as defined by a governmental authority or a testing protocol defined by a manufacturer or a custom testing protocol. A user may apply a chosen testing protocol to plumbing systems which include multiple hot water lines and multiple cold water lines, such as condominium systems. A user may test a plurality of lines simultaneously and independently via a plurality of testing branches of a testing apparatus such as the pressure testing apparatus 500. Data from each testing branch may be analyzed independently. In some examples, test data may be analyzed separately for each testing branch and then test data and analysis may be combined into a single report.

The present invention has been described here by way of example only. Various modification and variations may be made to these examples without departing from the scope of the invention, which is limited only by the appended claims.

The invention claimed is:

1. A method of pressure testing a plumbing system, comprising:
   coupling a portable pressure testing apparatus to the plumbing system;
   pressurizing the plumbing system to a predetermined start pressure using a fluid pump of the portable pressure testing apparatus;
   recording, using a control system of the portable pressure testing apparatus, a system pressure of the plumbing system for a predetermined period of time using a pressure sensor of the portable pressure testing apparatus;
   recording, using a location system of the portable pressure testing apparatus, a location of the portable pressure testing apparatus while recording the system pressure, the location including barometer data; and
   providing the system pressure of the plumbing system for the predetermined period of time and the location together as a record of the pressure testing, and
   prior to pressurizing the plumbing system to a predetermined start pressure using the fluid pump of the portable pressure testing apparatus:
      operating the fluid pump to pre-pressurize an upstream portion of a conduit assembly of the portable pressure testing apparatus while the conduit assembly is fluidly separate from the plumbing system, the upstream portion leading from the fluid pump; and
      fluidly joining the fluid pump and the plumbing system via the pre-pressurized conduit assembly.

2. The method of claim 1, further comprising adding an installer company identifier and an operator identifier to the record of the pressure testing.

3. The method of claim 1, wherein the record identifies a building and a floor of the building at which the system pressure of the plumbing system for the predetermined period of time was collected.

4. The method of claim 3, further comprising adding an installer company identifier and an operator identifier to the record of the pressure testing.

5. A method of testing the pressure of a plumbing system, comprising:
   joining a fluid pump to the plumbing system via a conduit assembly of a pressure testing apparatus to form a joined system;
   running a pressure testing cycle of the pressure testing apparatus, the pressure testing cycle including:
      pressurizing the joined system to a first prescribed pressure of a plurality of prescribed pressures according to a preset operating schedule using the fluid pump of the pressure testing apparatus;
      after the joined system is at the first prescribed pressure, closing at least one testing branch of the conduit assembly to prevent fluid leakage from the joined system through the at least one testing branch and keeping the at least one testing branch closed for a first testing time of a plurality of testing times according to the preset operating schedule;
      after the first testing time, opening the at least one testing branch and pressurizing the joined system to a second prescribed pressure of the plurality of prescribed pressures;
      after the joined system is at the second prescribed pressure, closing the at least one testing branch to prevent fluid leakage from the joined system through the at least one testing branch and keeping the at least one testing branch closed for a second testing time of the plurality of testing times;
      monitoring the pressure of the joined system during the plurality of testing times using a pressure sensor of the pressure testing apparatus to compile a set of pressure data, the set of pressure data being time-stamped to show when the set of pressure data was obtained; and
      storing the set of pressure data on a data storage device to form a forensic record, and
      prior to pressurizing the joined system to the first prescribed pressure:
         fluidly separating the fluid pump from the plumbing system;
         operating the fluid pump to pre-pressurize an upstream portion of the conduit assembly, the upstream portion leading from the fluid pump; and
         fluidly joining the fluid pump and the plumbing system via the pre-pressurized conduit assembly.

6. The method of claim 5, wherein the second prescribed pressure is lower than the first prescribed pressure.

7. The method of claim 5, wherein the pressure testing cycle further includes determining a location of the pressure testing apparatus during the testing time using a location sensor of the pressure testing apparatus, including the location in the forensic record, and including clock time information in the forensic record.

8. The method of claim 5, wherein the conduit assembly includes a hot water line branch to be joined to a hot water line of the plumbing system and a cold water line branch to be joined to a cold water line of the plumbing system, and the hot water line branch and the cold water line branch may be independently closed.

* * * * *